United States Patent

[11] 3,561,517

[72] Inventors James Donovan
 Cambridge;
 James L. Baird, Winchester, Mass.
[21] Appl. No. 807,530
[22] Filed Mar. 17, 1969
[45] Patented Feb. 9, 1971
[73] Assignee Artisan Industries, Inc.
 Waltham, Mass.
 a corporation of Massachusetts

[54] WIPED FILM PROCESSING APPARATUS WITH HEATED, CYLINDRICAL, FLUTED, INTERIOR SURFACE
 5 Claims, 4 Drawing Figs.

[52] U.S. Cl. ................................................... 159/6
[51] Int. Cl. ................................................... B01d 1/22
[50] Field of Search ........................................... 159/6 (W),
 6 (WH), 13 (A), 49; 203/89; 202/236;
 259/(Inquired)

[56] References Cited
 UNITED STATES PATENTS
 834,516  10/1906  Gathmann ................... 159/49
 2,606,146  8/1952  Luten, Jr. .................... 202/236
 3,388,733  6/1968  Jackering .................... 159/4E
 FOREIGN PATENTS
 820  11/1896  Denmark ..................... 159/6W
 137,934  7/1903  Germany ..................... 159/6W
 25,634  0/1897  Great Britain ............... 159/6W
 445,209  4/1936  Great Britain ............... 202/236

Primary Examiner—Norman Yudkoff
Assistant Examiner—J. Sofer
Attorneys—Richard P. Crowley, Philip G. Kiely and Richard L. Stevens

ABSTRACT: In a horizontally axised wiped thin-film evaporator the evaporative surface of the processing chamber is fluted. The flutes extend from one to the other end of the chamber. This irregular evaporative surface increases significantly the heat exchange coefficient and provides means to control the residence time of the material being processed.

PATENTED FEB 9 1971 3,561,517

*INVENTORS*
JAMES DONOVAN
JAMES L. BAIRD
BY Crowley, Keily
and Stevens
ATTORNEY

WIPED FILM PROCESSING APPARATUS WITH HEATED, CYLINDRICAL, FLUTED, INTERIOR SURFACE

BACKGROUND OF THE INVENTION

In the processing, treating, or handling of organic resins, polymers, or solutions, it is often desirable to remove a solid or liquid material from a resin, solution emulsion, slurry, suspension, or mixture. One means to accomplish the removal of a solvent or liquid material is through the use of thin-film technology. That is, a thin film of the material to be concentrated is placed on the inner wall of a closed processing chamber to provide a surface for evaporation. Normally about this chamber, is a heat exchange jacket to introduce heat into the thin film thereby evaporating the solvent as desired. The thin film is generally placed on the walls of the chamber by means of rotor blades or the like, the edges of which are spaced slightly apart from the interior wall of the chamber.

In the processing of material in thin-film apparatus the feed material to be concentrated is generally introduced into one end of the evaporator and the product removed from the other end, and the vapor created by the evaporation of the solvent is withdrawn either from the product end of the evaporator or from the feed end, depending upon whether the vapor flow is countercurrent or concurrent.

In thin-film evaporation the placing of the material to be evaporated on a chamber wall in thin-film form increases the effective heat transfer area over other types of conventional evaporating apparatus. However, one drawback to this method is that the material normally flows through the processing chamber in a very rapid manner whereby in some instances the material to be concentrated cannot be reduced to the desired concentration in a single pass. This necessitates either using auxiliary equipment to bring the feed material to a desired concentration or the employment of features or devices on the thin-film equipment itself to increase the residence time of the material in the processing chamber.

One means suggested to increase the residence time is described in U.S. Pat. No. 3,348,600 issued to Leo J. Monty. This involved the placing of wedges on the peripheral ends of the rotor blades to control the flow of thin film through the processing chamber. This method and apparatus are entirely satisfactory to bring a solution to the desired concentration in a single pass where the material can remain in an evaporative condition under high temperature without thermal degradation.

Also, other types of auxiliary equipment would include using a falling or rising film-type evaporator whereby the material is concentrated to the desired degree in one operation.

SUMMARY OF THE INVENTION

We have developed a new and improved wiped thin-film processing apparatus which provides an increased heat transfer area to give higher concentrations of material in a shorter period of time and which eliminates the need for providing apparatus which increases or decreases the hold time or residence time of the material in the processing chamber or the necessity for auxiliary equipment to bring the material to the desired concentration.

Briefly, our invention increases significantly the heat transfer coefficient in wiped thin-film evaporators and, additionally, provides a method of controlling the residence time of the thin film being processed therethrough. Our invention comprises a closed chamber having an interior wall, a rotor within the chamber, means to rotate the rotor, radially and axially arranged rotor blades on the rotor extending from the axis into a close thin-film association with the interior wall of the chamber and a feed inlet and a product outlet. About the processing chamber is a heat-exchange jacket.

The interior surface on the wall of the processing chamber against which the thin film of material is wiped is characterized in that it is irregular. That is, the surface of revolution may be corrugated, fluted, serrated, or have ridges or grooves thereon. This design of the interior wall of the processing chamber as heretofore described may take on any of several embodiments depending upon the result desired. For example, to provide maximum increase of effective heat transfer area whereby the heat transfer coefficient or factor of the entire processing chamber is increased significantly, then the interior wall would be typically fluted with the roots and crests running generally parallel with the longitudinal axis of the rotor shaft. However, if desired, to either increase or decrease the residence time while still increasing the overall heat transfer area of the thin-film processing apparatus, then a helical or convoluted twist may be imparted to the roots and crests of the fluted surface along the entire length of the processing chamber.

The practical effect of the fluted surface on the processing chamber is to provide a continuing series of baffles or a baffling effect on the wall surface while significantly increasing the heat transfer factor within the processing chamber. Further, if desired the flutes may only extend for a limited axial extent of the internal area of the processing chamber.

Accordingly, our invention provides for increasing significantly the heat transfer factor in a thin-film processing apparatus and, further, provides means to control the residence time of the material therein and is particularly appropriate for the processing of heat sensitive materials.

BRIEF DESCRIPTION OF THE PREFERRED EMBODIMENTS

In its preferred embodiment, our invention will be described in connection with a horizontally-axised rotary wiped thin-film evaporator, wherein vapor is generated during the processing operation following the same direction as the product, i.e., concurrent with respect to the feed material. Our invention may also be employed in evaporators wherein the flow of the vapor to the liquid feed is countercurrent.

Figure 1:
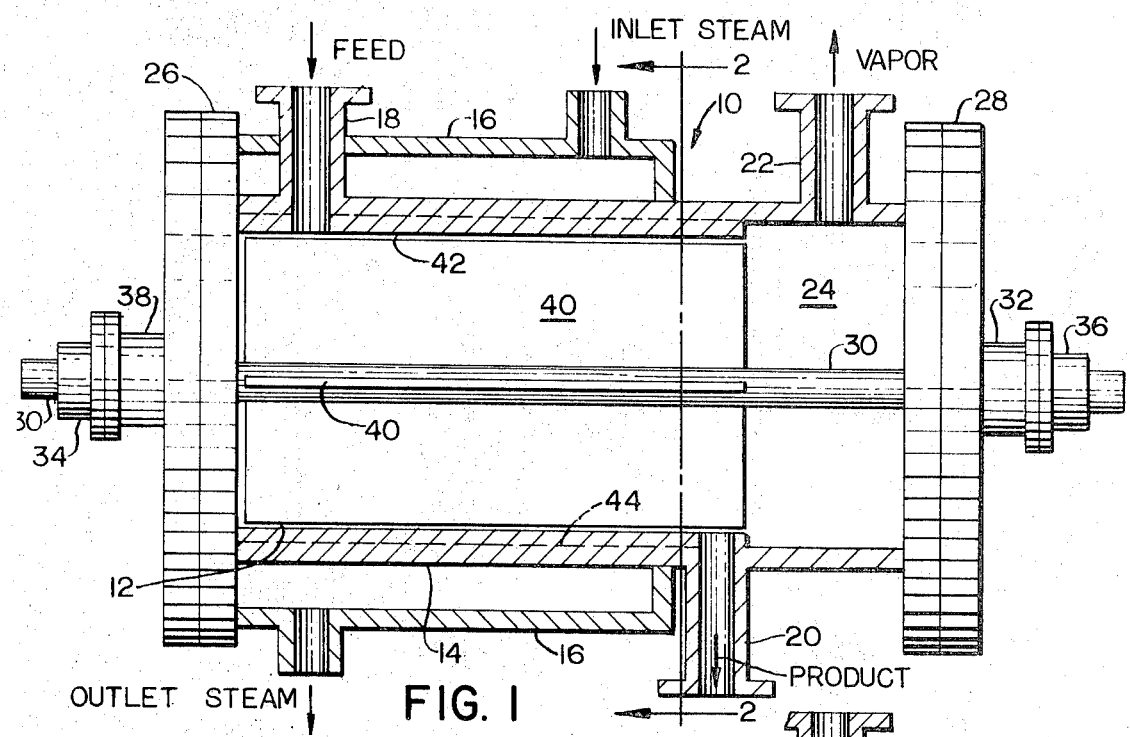
FIG. 1 is a schematic illustration of our preferred embodiment.

Referring to FIG. 1 our present invention is shown wherein a horizontally axised evaporator 10 comprises a closed cylindrical chamber 12 having interior walls 14 and surrounded to a great part of its length by a temperature control jacket 16 adapted for the introduction of a heating or cooling heat-exchange fluid such as steam, cold water, or the like. The chamber 12 is characterized by a feed inlet 18, a product outlet 20 at the downstream end thereof and a vapor outlet 22 which vapor outlet extends from a vapor chamber 24 adjacent to the product end of the evaporator. Closing heads 26 and 28 are secured to either end of the chamber 14 and support a horizontally inclined central-axised tubelike rotor 30 which extends from the one to the other end of the chamber 14 and through the vapor chamber 24. The rotor 30 is driven by a motor or other means (not shown), and generally extends outwardly through each end of the closing heads. The rotor 30 extends through suitable bearings 36 and 34 and seals or packing material 32 and 38 which are disposed at either end of the evaporator. The rotor shaft is mounted for axial displacement or adjustment either desired or convenient means which may include a series of grooves or threads which locate the rotor shaft with respect to the end plates 26 and 28. Extending axially outward from the rotor shaft 30 are a plurality of radial rotor blades 40, the blade tips of which extend into a small but generally uniform closely spaced relationship with respect to the interior wall 14 of the chamber 13 whereupon rotation of the shaft 30 the rotor blades 40 provide a thin wiped or turbulent film of material on the interior walls 14 of the chamber 12.

Figure 2:
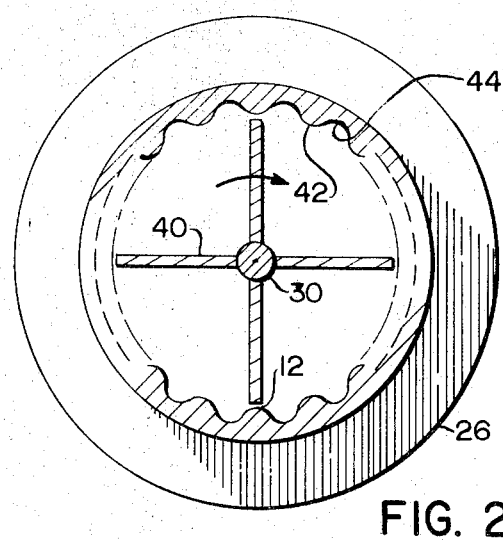
FIG. 2 is a sectional view of FIG. 1 taken along lines 2—2.

As shown in FIGS. 1 and 2, the interior wall or surface of revolution 14 is characterized by a plurality of alternating roots 42 and crests 44 which extend from one to the other end of the processing chamber and have a slight helical twist imparted therein in the direction of the rotation of the rotor blades. Of course, if desired, these may be straight. The helical offset from one to the other end of the chamber may vary from ½ to 30° although typically it is from approximately 2° to 4° from one to the other end. Also as shown, only the surface 14 is fluted. However, the entire wall may be fluted if desired.

In the operation of our invention, a liquid such as a low viscosity liquid to be processed through the evaporator 10 is introduced into the feed inlet 18 with the relatively nonvolatile product material withdrawn through the product outlet 20 and the vaporized material withdrawn through the vapor outlet 22. Of course, if desired, other vapor product outlets and feed inlets may be used. The shaft 30 and the rotor blades 40 are rotated at high speed during the processing to form a thin film of the feed material against the chamber wall 14. A heat exchange fluid, such as steam, is introduced into the heat exchange jacket 16 whereby the thin film on the interior wall is placed in a heat exchange relationship with the steam in the heating jacket to effect an evaporation of the relatively volatile component of the feed material as the material is processed through the evaporator. As the rotor blades rotate, the thin film of the material is formed on the irregular surface 14 flowing over the crests and roots of said surface. As is clear, the effective amount of increased heat transfer area is increased significantly. Accordingly, in one pass through the evaporator the degree of concentration is significantly greater than if a smooth walled processing chamber were used. Additionally, the roots and crests extend longitudinally along the processing chamber and are offset one from the other end by about 3°3°.

Accordingly, when the material strikes a slope of the irregular surface, a vector component is imparted to the material and is thrust forwardly toward the product outlet thereby decreasing the residence time of material in the evaporator. After the material has been processed, it then is discharged through the product outlet 20 and the vapor created by the evaporation enters into the vapor chamber 24 and exits the vapor outlet 22.

Figure 3:
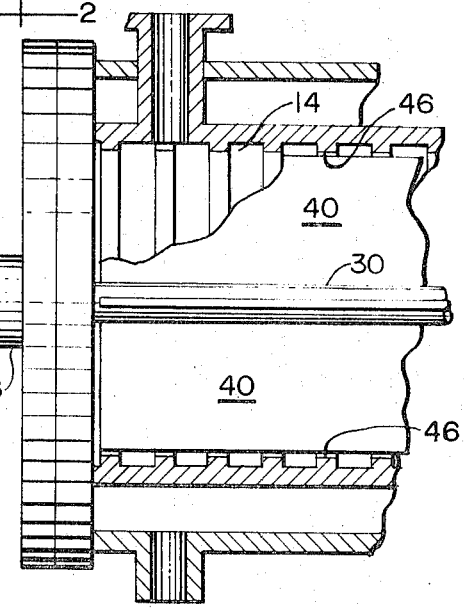
FIGS. 3 and 4 are alternative embodiments of our invention.

An alternative embodiment of our invention is shown in FIG. 3 wherein a plurality of ridges 46 are placed on the internal wall of the processing chamber which ridges are substantially perpendicular to the rotor shaft axis. In this embodiment the residence time of the material being processed is increased since the material when it strikes the ridge is given a vector component in the rearward direction, and the ridges acting as baffle elements also increase the effective heat transfer coefficient of the processing chamber. Of course, if desired, grooves may be used in lieu of ridges or there may be a plurality of alternating grooves or and ridges; and, further, the ridges as shown may either be continuous or formed by a plurality of arcuate segments. Although the ridges are shown as being straight sides sided, it is obvious they may be V-shaped with straight, concave, or convex walls, or the alternating ridges and grooves may form a semicircular elliptical parabolic, or sinusoidal pattern.

Figure 4:
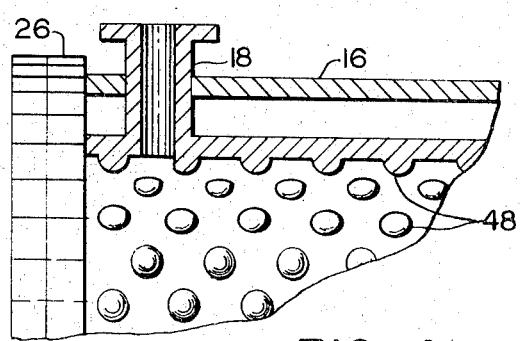

FIG. 4 is another alternative embodiment of my invention wherein the internal processing chamber is characterized by a series of alternating projections 48 on the surface, which may or may not be patterned, to provide an increased effective heat transfer area.

Although our invention has been described in reference to horizontally axis thin film evaporators with concurrent vapor flow, it is obvious that it may also be employed in inclined axised vertical and/or tapered wiped film evaporators.

Also, although our invention has been described in particular with reference to concentration or evaporation of materials, it may be used for any type processing operation, such as, drying, fractioning, distillation, sublimation, absorption, adsorption, and reactions where the hold up or residence time of the processed material is of importance. Further, if a reaction is carried out with our invention, the increased effective heat transfer area on the surface of revolution may serve to aid in the removal of heat generated in an exothermic reaction. Typical reactions which may be carried out are sulfonation, nitration, halogenation, condensation, and esterification.

Conversely, in an endothermic reaction, the increased effective heat transfer area may serve to aid in the introduction of heat required for the reaction. In both instances, the configuration of the surface of revolution also control the residence time.

We claim:

1. A fluid processing apparatus of the rotary thin-film type which comprises in combination:

a generally horizontally axised closed processing chamber having an annular interior wall characterized in transverse section by a fluted surface to increase the effective heat transfer of the surface of revolution and to control the residence time of the fluid material flowing through the apparatus;

a rotor within the chamber;

means to rotate the rotor;

rotor blades extending from one to the other end of the chamber secured to the rotor for rotation therewith the blades generally radially and coaxially arranged from the rotor and extending into a close noncontacting relationship with the crests of the chamber wall to form a small space between the edge of the rotor blades and said crests during rotation of the rotor blades;

an inlet at one end of the chamber for the introduction of material to be processed;

an outlet in the chamber axially spaced downstream from the inlet for the removal of processed material from the chamber; and a temperature control jacket externally surrounding the closed chamber whereby the fluid material to concentrated is processed in thin film form and flows over said interior wall which is thus adapted to provide an increased area for heat transfer and further, which interior wall controls the residence time of the material flowing over the surface.

2. The apparatus of claim 1 wherein the roots and crests of the flutes are generally parallel to the longitudinal axis of the rotor.

3. The apparatus of claim 1 wherein the roots and crests of the flutes are offset ½ to 30° from one to the other end of the processing chamber in the direction of rotation of the rotor blades.

4. The apparatus of claim 1 which includes a vapor chamber in communication with the processing chamber, the vapor chamber having a vapor outlet, the roots and crests offset ½ to 5° from one to the other end in the direction of rotation of the rotor blades.

5. The apparatus of claim 1 wherein the surface of the interior annular wall is characterized by centrally directed dimples rather than by a fluted surface.